United States Patent
Lin et al.

(10) Patent No.: US 6,576,890 B2
(45) Date of Patent: Jun. 10, 2003

(54) LINEAR OUTPUT NON-CONTACTING ANGULAR POSITION SENSOR

(75) Inventors: Yingjie Lin, El Paso, TX (US); Warren Baxter Nicholson, El Paso, TX (US)

(73) Assignee: Delphi Technologies, Inc., Troy, MI (US)

( * ) Notice: Subject to any disclaimer, the term of this patent is extended or adjusted under 35 U.S.C. 154(b) by 74 days.

(21) Appl. No.: 09/874,135

(22) Filed: Jun. 5, 2001

(65) Prior Publication Data

US 2002/0179825 A1 Dec. 5, 2002

(51) Int. Cl.[7] .................................................. G01D 5/34
(52) U.S. Cl. .................................. 250/231.14; 324/207.2
(58) Field of Search ........................ 324/207.2, 207.25, 324/207.21; 384/448; 250/208.1, 557, 236, 360.1, 231.13, 231.14, 231.18, 231.15; 341/20

(56) References Cited

U.S. PATENT DOCUMENTS 5,861,745 A * 1/1999 Herden ..................... 324/207.2

* cited by examiner

Primary Examiner—David Porta
Assistant Examiner—Patrick J Lee
(74) Attorney, Agent, or Firm—Margaret A. Dobrowitsky

(57) ABSTRACT

A linear output and non-contacting angular position sensor has a rotatable arc segment magnet arranged to rotate about the stationary components of the sensor, which include a pair of stationary flux concentrators, separated by a Hall probe; or, the magnet may be arranged to rotate at the center of the sensor with the stationary components fixed outside the magnet. With either arrangement, the Hall probe produces a direct 0 to 5 V d.c. output which varies linearly with the rotational angle of the magnet as the magnet rotates through a predetermined angle. The predetermined angle of rotation is generally equal to the arc formed by the flux concentrators and the arc of the magnet is generally 20–40% greater than the arc of the flux concentrators.

9 Claims, 2 Drawing Sheets

LINEAR OUTPUT NON-CONTACTING ANGULAR POSITION SENSOR

TECHNICAL FIELD

This invention relates to angular position sensors, and in particular, a magnetic non-contacting angular position sensor whose output signal is linearly related to angular position over a range of ±90°.

BACKGROUND OF THE INVENTION

It is known in the art relating to angular position sensors that a magnetic non-contacting angular position sensor may provide a linear output over a limited measurement range of ±55 to 60°. Applications for most commercially availably prior art sensors are limited by the structure of the sensor, which requires the rotating member, i.e. the permanent magnet, to rotate at the center of the sensor, with certain stationary components including a Hall probe being located outside the magnet. Prior art sensors which do teach a rotating magnet rotating about interiorly located stationary components, however, require the rotating magnet member to be cylindrical or tubular in shape with a cylindrical gap separating the rotating member and the stationary components. The requirement of a cylindrical gap between the stationary components and the rotating member limits the size, shape and arrangement of both the permanent magnet and the stationary components, which necessarily increases the cost of manufacture.

SUMMARY OF THE INVENTION

The present invention provides a low cost, versatile non-contacting angular position sensor that provides a linear output over a greater range than that of the prior art sensors. According to the present invention, a permanent rotating magnet may be coupled to a rotating shaft at the center of the sensor with the stationary components (a Hall sensor disposed between a pair of soft steel flux concentrators) located coaxially outside the magnet, or it may be coupled to a rotating outer hub with the stationary components fixed at the center of the sensor. There is no shape requirement for the gap between the rotating magnet and the stationary components. In fact, analysis has shown that varying the size and shape of the gap has little effect on the range of linear output. If the gap is too wide, however, signal strength is compromised. Accordingly, an ideal range for the gap is 0.5–2 mm. Both arrangements provide a linear output over a range of ±90°.

The present invention advantageously reduces the cost of materials while increasing the range of linear output, by providing a permanent, radially magnetized arc segment magnet whose enclosed angle is only 20–40% greater than the arc of the concentrator, the size of which directly corresponds to the range of desired measurement. Thus, if the desired range of measurement is ±90° (180°), then the sensor will provide linear output where the flux concentrators form an arc of approximately 180°, and the arc segment magnet is in the range of approximately 220–250°. Accordingly, if the desired range of measurement is ±60°, the flux concentrators should form an arc of 120°, and the arc angle of the segment magnet should be in the range of approximately 145–165°.

The present invention also includes a programmable Hall sensor, situated between a pair of soft magnetic flux concentrators. Because the size of the rotating magnet is reduced, the size of the flux concentrators is likewise reduced. Optimum results are achieved where the flux concentrators form an arc of 180°, less than the enclosed angle of the arc segment magnet.

Because both the Hall sensor and the flux concentrators remain stationary, any field generated by the rotating magnet moves from one end of one flux concentrator, to the end of the second flux concentrator, straight across the Hall sensor. The Hall sensor produces a direct 0 to 5 V d.c. voltage that varies linearly with the position of the magnet as it rotates through ±90°. When the magnetic flux is perpendicular to the Hall sensor, the sensor output is at its maximum, even though flux strength remains constant. Depending on the location of the magnetic poles and the direction of the chip within the Hall sensor, the angular position sensor may be calibrated so that when the magnet is rotated in one direction, clockwise, for example, the voltage will read from 2.5 to +5 volts and when the rotation of the magnet is reversed, the voltage will read from 0 to 2.5 volts where 2.5 V represents 0 flux.

These and other features and advantages of the invention will be more fully understood from the following description of certain specific embodiments of the invention taken together with the accompanying drawings.

DESCRIPTION OF THE PREFERRED EMBODIMENT

Figure 1:
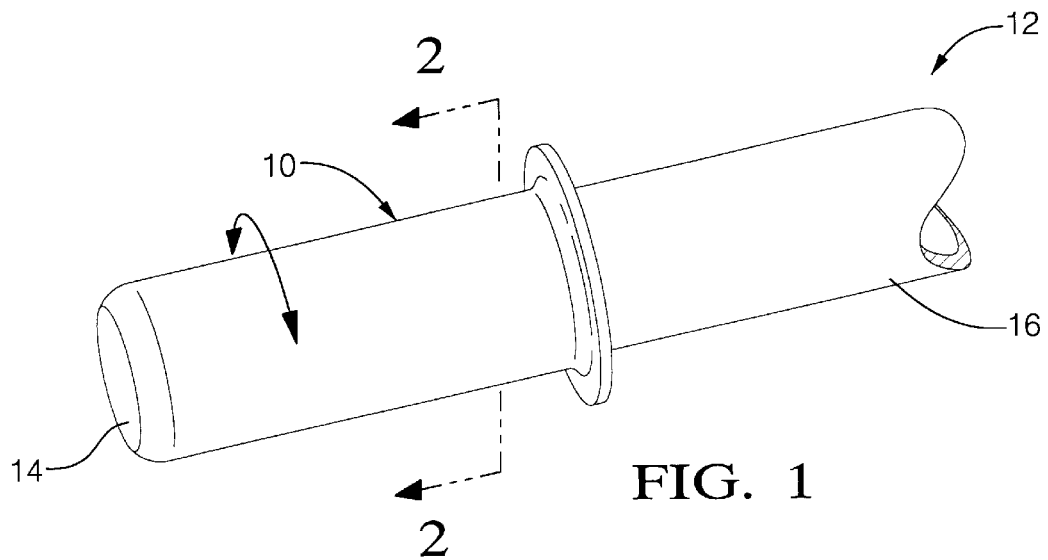
FIG. 1 illustrates a first application of a first embodiment of the sensor according to the invention where the sensor monitors the handlebar throttle position of motorcycle.

Referring now to the drawings in detail, numeral 10 generally indicates a linear output and non-contacting angular position sensor according to the present invention. FIG. 1 illustrates a first embodiment of the sensor 10 as it is used to measure the handlebar throttle position of a motorcycle.

In the application of FIG. 1, the motorcycle handlebar 12 is shown having a rotating throttle portion 14, which forms a housing of the sensor 10, and a fixed handlebar portion 16.

Figure 2:
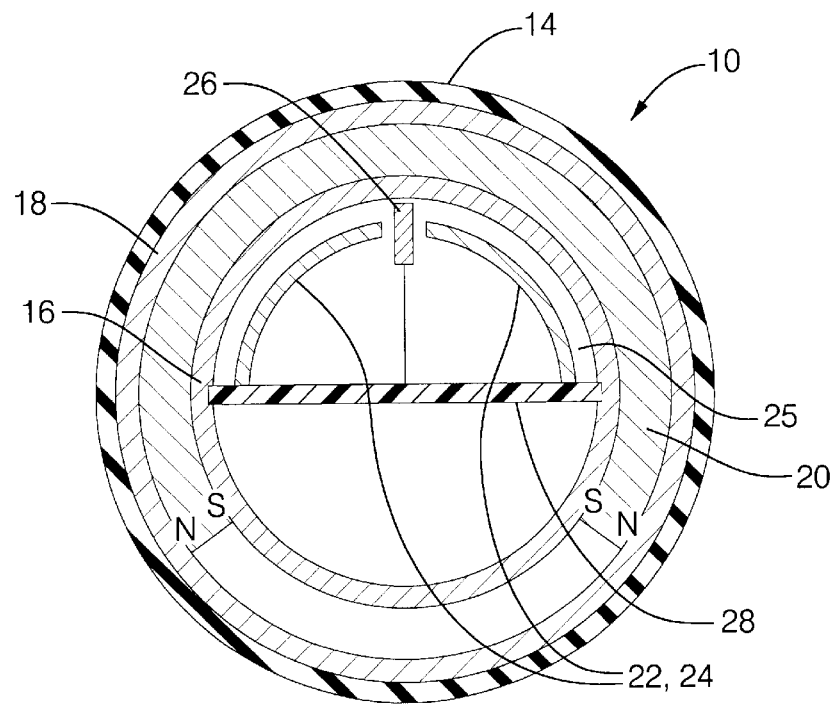
FIG. 2 is a cross-sectional view of the angular position sensor along the line 2—2 of FIG. 1.

As illustrated in FIG. 2, the first embodiment of the sensor 10, includes a flux containment ring 18, in this case a steel ring, integral with the rotating throttle portion 14 of the handlebar 16. Joined internally to and rotatable with the flux containment ring 18 is a radially magnetized arc segment magnet 20. Magnetic flux produced by the arc segment magnet is contained within the sensor by the flux containment ring 18, which also serves to minimize the effects of outside magnetic fields on the sensor output.

The radially magnetized arc magnet 20 of FIG. 2 has its south pole on its inner perimeter and its north pole on its outer perimeter. Although there is no known limit as to the type of magnetic material that may be selected for the permanent magnet, preferred magnetic materials include Samarium Cobalt and Neodymium Iron Boron.

The arc magnet 20 has an enclosed angle in the range of 220–250 degrees. In this embodiment, the arc segment magnet 20 rotates about a pair of flux concentrators, 22, 24, which remain fixed within the arc segment magnet 20. The magnet 20 and the flux concentrators 22, 24 are separated by a radial gap in the range of 0.5 to 2 mm. The gap may be formed by the nonmagnetic wall 16 or an airspace 25 or a combination thereof as shown in FIG. 2.

The flux concentrators 22, 24 form an arc of approximately 180°. To minimize hysteresis in the sensor, flux concentrators 22 and 24 are preferably made from a material with low coercive force, i.e. a soft magnetic material. Such materials include silicon steel, 49% nickel steel or ferrite.

A programmable Hall sensor 26 is mounted between the flux concentrators 22, 24. Hall sensors which have been successfully tested include Melexis, part no. MLX 90215 and Micronas, part no. HAL 805. These programmable Hall sensors include circuitry that accounts for temperature compensation, where the temperature coefficient of the magnet is programmed upon initial calibration of the sensor. The Hall sensor 26 is hard wired to a circuit board 28, mounted inside the fixed handlebar section 16, which delivers a signal to the microcontroller of the vehicle (not shown).

As shown in FIG. 2, the arc segment magnet 20 is in symmetry with the flux concentrators 22, 24 and the Hall sensor 26. In this position, no flux passes through the Hall sensor, and its output level is 2.5 V. As the throttle 14, and consequently the arc magnet 20, is rotated, the Hall sensor 26 senses the unbalance, and produces a voltage that is linearly related to the position of the throttle as it rotates from 0 to 180°. For example, if the throttle rotates +45° from its initial position, the voltage output of the Hall sensor 26 is 3.75V or 1.25 V for −45°.

Figure 3:
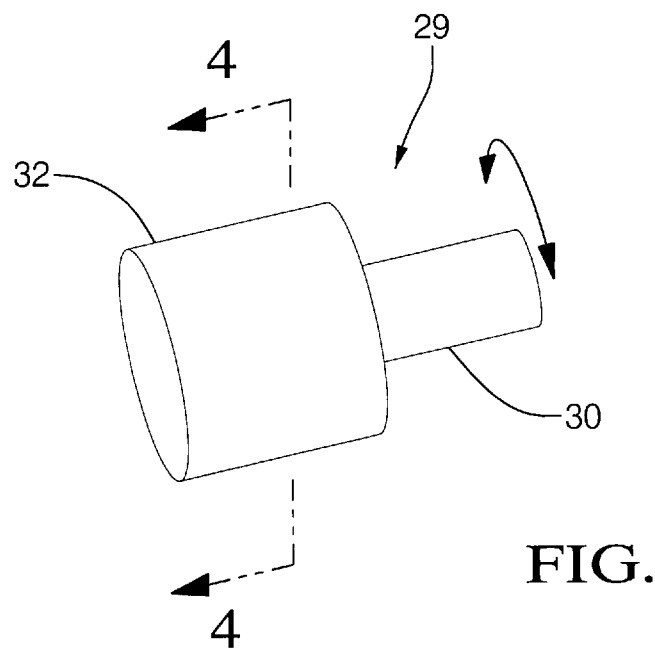
FIG. 3 illustrates a second application of a second embodiment of the sensor according to the invention where the sensor is coupled to a rotating shaft.

FIG. 3 illustrates a second embodiment of the sensor where the sensor 29 has a central rotating shaft 30. The shaft 30 can be connected to measure body height, pedal position, or door position, for example.

Figure 4:
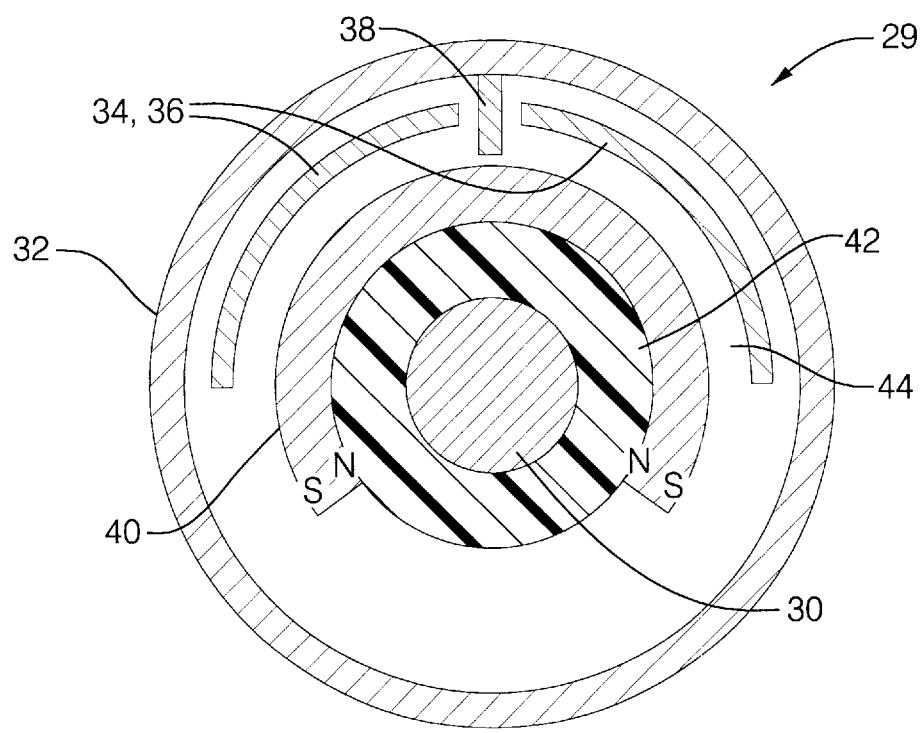
FIG. 4 is a cross-sectional view of the angular position sensor along the line 4—4 of FIG. 3.

FIG. 4 shows a cross section of the sensor 29 along the line 4—4 of FIG. 3. Disposed within a sensor housing 32, are flux concentrators 34, 36 separated by a Hall sensor 38. In this embodiment, arc segment magnet 40 is radially magnetized so that its south pole is on its outside surface and its north pole is on its inside surface. Of course, the poles of the magnet may be reversed in either embodiment upon initial calibration of the Hall sensor 38 and flux concentrators 34, 36.

Magnet 40 is shown coupled to an insulating plastic hub 42, which in turn is coupled to the rotating shaft 30. An air gap 44 separates the magnet 40 from the flux concentrators 34, 36 and Hall sensor 38.

FIG. 4 illustrates the magnet 40 in symmetry with flux concentrators 34, 36 and the Hall sensor 38. As the shaft 30 rotates through ±90°, the magnet 40 rotates, causing the magnetic flux to flow, resulting in a voltage output from Hall sensor 38. As was the case for the first embodiment of the sensor, that output voltage is linearly related to the position of the shaft 30 and magnet 44 as they rotate from 0 to 180°.

While the invention has been described by reference to certain preferred embodiments, it should be understood that numerous changes could be made within the spirit and scope of the inventive concepts described. Accordingly, it is intended that the invention not be limited to the disclosed embodiments, but that it have the full scope permitted by the language of the following claims.

What is claimed is:

1. A non-contacting angular position sensor, comprising:
   a rotatable member, the angular position of which, is to be measured; said member being rotatable through a predetermined angle,
   a pair of flux concentrators arranged to form an arc having an enclosed angle generally equal to said predetermined angle of rotation;
   a rotatable, radially magnetized arc segment magnet coupled to said rotatable member, said arc segment magnet having an enclosed angle generally in the range of 20–40% greater than the arc of said flux concentrators;
   said magnet and said pair of flux concentrators being radially spaced, one within the other, with a gap between them; and
   a Hall sensor fixed between said flux concentrators, wherein an output of said Hall sensor linearly relates to the position of the member as the member rotates through said predetermined angle.

2. The sensor of claim 1 wherein said flux concentrators form an arc of 180°.

3. The sensor of claim 1 wherein said flux concentrators are composed of one of silicon steel, nickel steel and ferrite.

4. The sensor of claim 1 wherein said member is a rotatable shaft centrally disposed within said housing.

5. The sensor of claim 1 wherein said radially magnetized arc segment magnet, said pair of flux concentrators and said Hall sensor are housed within a sensor housing.

6. The sensor of claim 5 wherein said rotatable member is a central shaft and said flux concentrators and said Hall sensor are disposed outward of the arc segment magnet.

7. The sensor of claim 5 wherein said housing is the rotatable member and said flux concentrators and said Hall sensor are disposed inward of the arc segment magnet.

8. The sensor of claim 7 wherein a flux containment ring surrounds said arc segment magnet to contain magnetic flux of the magnet within the sensor housing.

9. The sensor of claim 1 wherein said predetermined angle is ±90°.

* * * * *